United States Patent Office 3,002,913
Patented Oct. 3, 1961

3,002,913
NUCLEAR RADIATION TO IMPROVE SHEAR STABILITY OF P-XYLYLENE COPOLYMER V.I. IMPROVING AGENTS
Manuel A. Pino, Richmond, Calif., assignor, by mesne assignments, to the United States of America as represented by the United States Atomic Energy Commission
No Drawing. Filed Mar. 30, 1959, Ser. No. 802,646
5 Claims. (Cl. 204—162)

This invention is directed to a new process whereby the shear stability of certain particular viscosity index improving agents is improved. In particular, this invention pertains to a process whereby nuclear radiation of p-xylylene copolymers improves the shear stability thereof.

The greater proportion of oils obtainable by refining processes and useful as base oils for lubricating oil compositions have wide variations in viscosity characteristics with changes in temperatures. They do not have agents specifically incorporated therein for the purpose of imparting reduced changes in viscosity with the changes in temperature. That is, at a particular temperature, a lubricating oil may be quite viscous, while at higher temperatures the same lubricating oil may have a viscosity of a fluid such as kerosene. In order that the viscosity of a lubricating oil composition will not change rapidly with the changes in the temperature of an internal combustion engine, for example, numerous additives have been designed to modify the viscosity-temperature characteristics of lubricating oils. Thus, the changes in the viscosities occurring with variations in temperatures are kept at a minimum.

The viscosity-temperature relationship of a lubricating oil is referred to as the viscosity index (V.I.); the higher the viscosity index, the less the change in viscosity with temperature.

The art is replete with numerous viscosity index improving agents, however, of particular interest here, are certain viscosity index improving agents which are thermally stable and which improve the viscosity index of lubricating oil compositions, including lubricating oil compositions used in an atmosphere of nuclear radiation. Such viscosity index improving agents are p-xylylene copolymers, which include the poly(alkyl benzene-p-xylylenes) described in U.S. patent application 773,161; the poly(diphenyl ether-p-xylylenes) described in U.S. patent application Serial No. 773,149; and the poly(diphenyl alkane-p-xylylenes) disclosed in U.S. patent application Serial No. 773,160; which patent applications were filed November 12, 1958. These p-xylylene copolymers are polymers which contain p-xylylene groups bonded through the methylene groups to benzene rings. Although the above particular p-xylylene copolymers improve the viscosity index characteristics of lubricating oil compositions, such viscosity index improving agents have relatively low shear stability. That is, under conditions wherein lubricating oil compositions containing such p-xylylene copolymers are subjected to extreme pressures or are used in gears or other moving parts separated by small clearances, the V.I. improving agents break down. As a result thereof, the viscosity and the V.I. of oils compounded with these particular V.I. improving agents decrease on working, resulting in improper lubrication of moving parts.

Therefore, it is a primary object of this invention to improve the shear stability of p-xylylene copolymers which are useful as V.I. improving agents in lubricating oil compositions.

In accordance with this invention, it has been discovered that the shear stability of p-xylylene copolymers can be improved by subjecting these copolymers to an atmosphere of nuclear irradiation. By the process of nuclear radiation of p-xylylene copolymers, the shear stability thereof is markedly improved.

The particular p-xylylene copolymers are described as follows:

(1) Alkyl benzene p-xylylene copolymers of the formula:

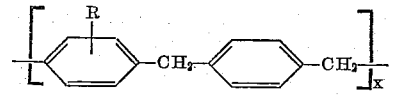

wherein R represents branched or straight-chained hydrocarbon radicals containing from 2 to 20 carbon atoms, and X is a number representing the number of monomeric units in the polymer.

(2) Poly(diphenyl alkane-p-xylylenes) of the formula:

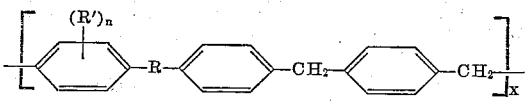

where R represents a saturated hydrocarbon radical containing from 1 to 10 carbon atoms, R' is an alkyl group containing from 4 to 12 carbon atoms, n is a number from 0 to 3, and X is a number representing the number of monomeric units in the polymer; and (3) Poly(diphenyl ether-p-xylylenes) of the formula:

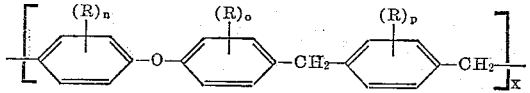

wherein R represents branched or straight-chained hydrocarbon radicals containing from 2 to 20 carbon atoms; n, o, and p are numbers from 0 to 3; and X is a number representing the number of monomeric units in the polymer.

The p-xylylene copolymers are exemplified as follows: poly(n-nonylbenzene-p-xylylene), poly(n-butylbenzene-p-xylylene), alkylated poly(diphenylmethane-p-xylylene), poly(1,9-diphenylnonane-p-xylylene), alkylated poly(diphenyl ether-p-xylylene), poly(alkylated bis(p-phenoxyphenyl) ether-p-xylylene), poly(diphenyl ether-p-xylylene), etc.

As V.I. improving agents, the above-described p-xylylene copolymers are used in a number of base oils, including mineral oils, such as naphthenic base, paraffin base, aromatic mineral oils, and mixed base oils derived from petroleum; synthetic oils, such as polymers of alkylene oxides; aromatic type lubricating oils, such as alkyl benzene, alkyl biphenyls, alkyl diphenyl ethers, polyalkyl terephenyls, polyphenyls, polyaryl alkanes, dialkyl benzenes, aryl esters, etc.

It is preferred that the above-described p-xylylene copolymers be dispersed (or solubilized) in aromatic type lubricating oils, and the resulting blend irradiated to improve the shear stability of the p-xylylene copolymers. Such aromatic type lubricating oils are exemplified hereinabove.

The amount of irradiation desirable for the purpose of improving the p-xylylene copolymers as viscosity index improving agents is dependent on the concentration of the p-xylylene copolymer in the aromatic lubricating oil. In general, the greater the concentration of p-xylylene copolymer, the less the amount of irradiation desirable. The amount of irradiation can vary from $10^7$ rads or less to $10^9$ rads; more specifically from $10^8$ to $5 \times 10^8$ rads.

Table I hereinbelow presents data showing the improvement of shear stability obtained by subjecting p-xylylene copolymers to nuclear radiation.

The gamma radiation source used herein was the spent nuclear reactor fuel canal facility located at the Materials Testing Reactor, National Reactor Testing Station, Idaho.

The shear stability was determined by subjecting an oil solution of the p-xylylene copolymer to the extremely rapid vibrations of a sonic oscillator at a temperature of 70° F. The oscillator itself consisted principally of a metal rod driven by a magnetostrictive device. The metal rod was immersed in the oil to be tested, and the frequency of oscillation applied to the rod was 10,000 cycles per second. The duration of the test was 120 minutes. The viscosities of the oil compositions were measured prior to and after the test.

The data of Table I report the radiation dosage levels in terms of rads.

Base oil (1) was an alkyl diphenyl ether, wherein the alkyl groups contained from 14 to 16 carbon atoms, and base oil (2) was isopropyl 1,9-diphenyl nonane. Viscosity index improving agents tested are designated as follows: (a) was a poly(1,9-diphenyl nonane-p-xylylene); (b) was a poly($C_{14-16}$-diphenyl ether-p-xylylene); and (c) was a poly($C_{12}$-diphenyl ether-p-xylylene).

Table I

| | Base Oil | V.I. Improving Agent | Conc., Wt. percent | Radiation Dosage (Rads) | Visc. of Oil Solution (cs. at 210° F.) | | Percent Change in Visc. at 210° F. After Oscillator Test | |
|---|---|---|---|---|---|---|---|---|
| | | | | | Before Irradiation | After Irradiation | No Irradiation | After Irradiation |
| 1 | (1) | (a) | 5 | 7.24 | 8.5 | 12.3 | −26.4 | −17.9 |
| 2 | (1) | (b) | 8.2 | 3.20 | 11.8 | 12.9 | −35.0 | −17.8 |
| 3 | (1) | (c) | 4.2 | 3.20 | 11.7 | 10.5 | −46.3 | −13.3 |
| 4 | (2) | (a) | 5.0 | 5.78 | 9.8 | 13.0 | −33.5 | −14.3 |

Thus, it is readily seen that the irradiation of the p-xylylene copolymers markedly increases their resistance to breakdown from shear when used as viscosity index improving agents in lubricating oil compositions.

I claim:

1. A process of improving shear stability of p-xylylene copolymers as viscosity index improving agents in lubricating oil compositions comprising irradiating aromatic lubricating oils containing said p-xylylene copolymers by means of nuclear radiation, at a dosage of $10^7$ to $10^9$ rads, wherein said nuclear radiation is gamma radiation, wherein said p-xylylene copolymers are polymers selected from the group consisting of poly(alkylbenzene-p-xylylenes), poly(diphenyl alkane-p-xylylenes), and poly(diphenyl ether-p-xylylenes).

2. A process of improving shear stability of p-xylylene copolymers as viscosity index improving agents in lubricating oil compositions comprising irradiating aromatic lubricating oils containing said p-xylylene copolymers by means of nuclear radiation, at a dosage of $10^8$ to $5 \times 10^8$ rads, wherein said nuclear radiation is gamma radiation, wherein said p-xylylene copolymers are polymers selected from the group consisting of poly(alkylbenzene-p-xylylenes), poly(diphenyl alkane-p-xylylenes), and poly(diphenyl ether-p-xylylenes).

3. The process of claim 1, wherein said copolymer is a poly(alkylbenzene-p-xylylene).

4. The process of claim 1, wherein said copolymer is a poly(diphenyl alkane-p-xylylene).

5. The process of claim 1, wherein said copolymer is a poly(diphenyl ether-p-xylylene).

References Cited in the file of this patent

UNITED STATES PATENTS

| 2,336,620 | Lieber et al. | Dec. 14, 1943 |
| 2,803,598 | Black | Aug. 20, 1957 |